United States Patent Office 3,749,765
Patented July 31, 1973

3,749,765
METHODS OF ANTAGONIZING BARBITURATES WITH URACIL THIOPSEUDOUREAS
Arthur Berger, Skokie, Ill., and Edeltraut E. Borgaes, Sindelfingen, Germany, assignors to Baxter Laboratories, Inc., Morton Grove, Ill.
No Drawing. Original application Aug. 13, 1969, Ser. No. 849,891, now Patent No. 3,637,703. Divided and this application June 15, 1971, Ser. No. 153,439
Int. Cl. A61k 27/00
U.S. Cl. 424—251          1 Claim

ABSTRACT OF THE DISCLOSURE

Uracil thiopseudoureas having the general formula

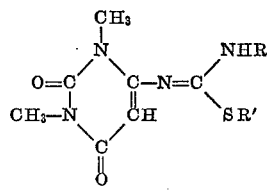

wherein R and R' are each independently selected from the group consisting of lower alkyl having from 1 to about 3 carbon atoms, allyl and methallyl, and the pharmaceutically acceptable acid salts thereof, for example, 1-allyl - 3 - (2',4'-diketo - 1',2',3',4' - tetrahydropyrimidin - 6 - yl) - 1',2,3' - trimethyl - 2 - thiopseudourea, are pharmaceutically administered to animals given an overdose of barbiturate for reviving said animals.

---

This is a divisional of application Ser. No. 849,891, filed Aug. 13, 1969, now U.S. Pat. 3,637,703.

The present invention relates to novel organic uracil thiopseudoureas. More particularly, this invention relates to ring substituted uracil thiopseudoureas having the general formula:

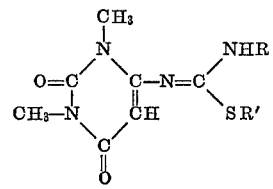

wherein R and R' are each independently selected from the group consisting of lower alkyl having from 1 to about 3 carbon atoms, allyl and methallyl; and the pharmaceutically acceptable acid salts thereof.

The compounds of the present invention have been found to have potent central nervous system anti-depressant activity in animals. The ability of these compounds to revive animals given large doses of barbiturates has been shown in mice. As such, the compounds of the present invention are useful agents for these and other animals as narcotic, barbiturate and anesthetic antagonists and as psychomotor and respiratory stimulants. These compounds are new compounds which have not been described heretofore in the literature and have unique barbiturate antagonist properties. Certain other thiopseudoureas are known to have local anesthetic properties as seen from U.S. Pats. 3,448,197–8, and various oter pharmaceutical properties as seen from U.S. Pat. 3,124,595, but these thiopseudoureas are structurally dissimilar to the present compounds in that they do not contain the uracil moiety.

The synthesis of the novel uracil thiopseudoureas of the present invention can be carried out by reacting lower alkyl halide with an appropriate uracil thiourea to form the hydrohalic salt as follows:

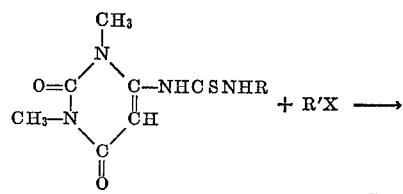

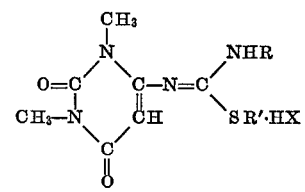

wherein R and R' are as previously defined and X is —Br, —Cl, or —I. This synthesis is facilitated by reaction in the presence of a mutual solvent such as a ketone, for example, acetone, or an alcohol, for example, ethanol.

The free base form of the uracil thiopseudourea can be prepared by reacting the salt with an alkaline reagent, for example, sodium carbonate, sodium hydroxide, aqueous ammonia, and other such alkaline reagents commonly employed for converting salts to free bases. The free base can be converted, in turn, to the salt form of the compound by reaction with a pharmaceutically acceptable acid, for example, sulfuric, phosphoric, nitric, hydrochloric, hydriodic, hydrobromic, acetic, citric, tartaric, lactic, malic, fumaric, succinic, ascorbic, pyruvic and the like inorganic and organic acids known to be pharmaceutically acceptable.

The synthesis of the intermediate uracil thioureas used in preparing the novel uracil thiopseudoureas of the present invention can be effected by reacting 6-amino-1,3-dimethyluracil with an appropriate isothiocyanate. This synthesis is facilitated by reaction in the presence of a mutual solvent such as an amide, for example, dimethylformamide, or a sulfoxide, for example, dimethylsulfoxide.

The general reaction can be described by the following equation:

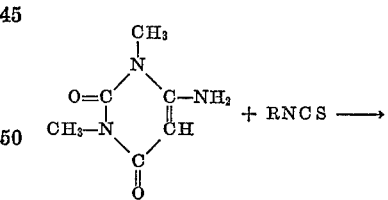

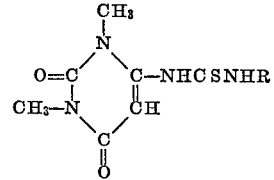

wherein R is as previously defined.

Illustrative of the isothiocyanates which can be used in the above reaction are the methyl, ethyl, propyl, allyl and methallyl isothiocyanates and the like. The isothiocyanate reagents are generally available commercially or can be made by conventional procedures, for example, by reaction of an amine, CS$_2$ and NaOH as described in "Organic Syntheses," Coll. Vol. III, p. 599 (1955), John Wiley & Sons, Inc., New York and London.

The compound 6-amino-1,3-dimethyluracil also is generally available commercially or can be made by conventional procedures, for example, by reaction of 1,3-dimethylurea with ethyl cyanoacetate as described by Traube, Ann., Vol. 432, p. 281 (1923).

Although specific methods of preparation of the novel uracil thiopseudoureas of the present invention are described herein, it will be understood that these compounds are not limited to these specific methods of preparation. For example, an alternative method of preparation consists of methylating the ring unsubstituted uracil thiopseudourea. Other methods of preparation of these compounds can be devised by those skilled in the art.

The novel compounds of the present invention have been administered both intravenously (i.v.) and intraperitoneally (i.p.) in aqueous solutions. These routes of administration as well as the oral route of administration can be used. Other methods of administration will be apparent to those skilled in the art.

Effective barbiturate antagonist dosages can range from about one to 1,000 mg. per kg. of body weight and can take the form of tablets, powders, capsules, elixirs and the like dosage forms in admixture with common solid and liquid diluents, carriers and adjuvants such as, for example, cornstarch, lactose, talc, stearic acid, magnesium stearate, gelatin, pectin, acacia and locust bean gums, alcohol, water, vegetable oils and the like materials. Other effective dosages of the novel compounds can be determined by reference to the specific examples set forth hereinafter. It has been unexpectedly found that high dosages of these compounds lose their toxicity in the presence of the active barbiturates and thus appear to be less toxic in the presence than in the absence of barbiturates.

The following examples will further illustrate the present invention although the invention is not limited to these specific examples. All percentages and parts herein are on a weight basis unless otherwise specified.

EXAMPLE I

Synthesis of 1-allyl-3-(2',4'-diketo-1',2',3',4'-tetrahydropyrimidin-6-yl) - 1',2,3' - trimethyl - 2-thiopseudourea hydroiodide To 120 ml. of acetone was added 15.3 grams (0.06 mole) of 1-allyl-3-(2,3-diketo-1,3-dimethyl-1,2,3,4-tetrahydropyrimidin-6-yl)-2-thiourea and 25.6 grams (0.18 mole) of methyl iodide. Initially the thiourea was insoluble, but after approximately 30 minutes of heating at reflux temperature, all of the solid had dissolved. A precipitate appeared on cooling and after the reaction mixture was allowed to stand at room temperature for about 1 hour, this solid was collected and washed with acetone and then petroleum ether. The dried white crystals weighing 21.1 grams (88.8% of the theoretical) which had M.P. 191–4° C. analyzed for the expected 1-allyl-3-(2',4' - diketo - 1',2',3',4' - tetrahydropyrimidin-6-yl)-1',2,3'-trimethyl-2-thiopseudourea hydroiodide.

EXAMPLE II

Example I is repeated except that allyl chloride is substituted for an equivalent amount of methyl iodide for reaction with 1-allyl-3-(2,3-diketo-1,3-dimethyl-1,2,3,4-tetrahydropyrimidin-6-yl)-2-thiourea at reflux temperature to produce 1,2-diallyl-3-(2',4'-diketo-1',3'-dimethyl-1',2',3',4'-tetrahydropyrimidin-6-yl)-2-thiopseudourea hydrochloride.

EXAMPLE III

Synthesis of 2',4' - diketo - 1,2,1',3'-tetramethyl - 3-(1', 2',3',4' - tetrahydropyrimidin - 6-yl)-2-thiopseudourea hydroiodide A mixture of 5.7 grams (0.025 mole) of 1-(2,4-diketo-1,3 - dimethyl - 1,2,3,4 - tetrahydropyrimidin-6-yl)-3-methyl-2-thiourea and 5.0 ml. (0.08 mole) of methyl iodide in 50 ml. of acetone solution was refluxed for 20 hours. An off-white solid formed even in the hot reaction mixture and after cooling to room temperature, it was collected, washed with fresh acetone and air-dried. The yield of yellow solid was 8.2 grams (88.7% of the theoretical) corresponding to 2',4' - diketo - 1,2,1',3'-tetramethyl - 3 - (1',2',3',4' - tetrahydropyrimidin - 6 - yl)-2-thiopseudourea hydroiodide.

EXAMPLE IV

Example III is repeated except that ethyl bromide is substituted for an equivalent amount of methyl iodide for reaction with 1 - (2,4-diketo-1,3-dimethyl-1,2,3,4-tetrahydropyrimidin-6-yl)-3-methyl-2-thiourea at reflux temperature to produce 2-ethyl-1(2',4'-diketo-1,2-dimethyl-1',2',3', 4' - tetrahydropyrimidin-6-yl)-3-methyl-2-thiopseudourea hydrobromide.

Other examples of the uracil thiopseudoureas of the present invention were synthesized according to the procedure of the above examples. The analytical data determined for five of these compounds are set forth in the following table:

TABLE I.—ANALYTICAL DATA ON URACIL THIOPSEUDOUREAS

| R equals | Melting point, °C. | Empirical formula | Calculated | | | Found | | |
|---|---|---|---|---|---|---|---|---|
| | | | C | H | N | C | H | N |
| CH₃ | 224–5 | C₉H₁₅IN₄O₂S | 29.20 | 4.08 | 15.13 | 29.16 | 3.95 | 15.15 |
| C₂H₅ | 162–4 | C₁₀H₁₇IN₄O₂S | 31.26 | 4.46 | 14.58 | 31.31 | 4.45 | 14.43 |
| Allyl | 191.4 | C₁₁H₁₇IN₄O₂S | 33.34 | 4.32 | 14.14 | 33.62 | 4.23 | 14.24 |
| C₃H₇ | 179–82 | C₁₁H₁₉IN₄O₂S | 33.17 | 4.81 | 14.07 | 33.36 | 4.78 | 14.01 |
| Methallyl | 158–9 | C₁₂H₁₉IN₄O₂S | 35.13 | 4.67 | 13.66 | 34.40 | 4.72 | 13.43 | sodium azide test at the end of 4 hours was still positive, indicating the reaction was not yet complete, but it was negative after 20 hours and the heating was then stopped.

The desirable central nervous system anti-depressant properties of the uracil thiopseudoureas of this invention are illustrated by the activity of these compounds in protecting mice against lethal doses of pentobarbital sodium (barbiturate antagonist activity). These illustrative results are shown in the following Tables II and III in which the compounds of the present invention are compared with seven reference central nervous system antidepressants. In this comparison, which is a modification of the procedure reported by Kimura and Richards, Arch. Intern. Pharmacodyn., vol. 110, pp. 29–42 (1957), the ability of the test compound to reverse a lethal dose of barbiturate is determined. The life or death of the test animals following administration of a lethal dose of the barbiturate and then a trial dose of the test compound is used as the end point to provide the values given in the tables as the effective $BAD_{50}$ (median barbiturate antagonist dose). The margin of safety of the test compound is shown by the ratio of the $LD_{50}$ (median lethal dose) to the effective barbiturate antagonist dose.

In this procedure, the $LD_{50}$'s and $BAD_{50}$'s were determined by subjecting the mice to at least three logarithmically graded doses with ten mice at each dose level for each compound and calculating according to the procedure of Miller et al., Proc. Soc'y. Exper. Biol. and Med., Vol. 57, p. 261 (1944). The lethal dose of the barbiturate which was administered was the $LD_{90-100}$ (the dose required to kill at least 9 of every 10 mice), or 126 mg./kilo of body weight.

TABLE II.—BARBITURATE ANTAGONIST DATA ON URACIL THIOPSEUDOUREAS

[mg./kg. in mice]

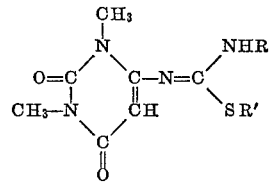

| R equals | $LD_{50}$, i.p. | $BAD_{50}$, i.p. | $LD_{50}/BAD_{50}$ |
|---|---|---|---|
| $CH_3$ | ¹ 700 | 108 | 6.5 |
| $C_2H_5$ | ¹ 480 | 9 | 53.3 |
| Allyl | 420 | 34 | 12.3 |
| $C_3H_7$ | ¹ 180 | 5.4 | 33.3 |
| Methallyl | ¹ 1,038 | 280 | 3.7 |

¹ Three animals tested at each dose.

TABLE III.—REFERENCE CNS ANTI-DEPRESSANTS

[mg./kg. in mice]

| Name | $LD_{50}$, i.p. | $BAD_{50}$, i.p. | $LD_{50}/BAD_{50}$ |
|---|---|---|---|
| Picrotoxin | 9.2 | 4.8 | 1.9 |
| Bemegride sold under the trademark "Megimide." | 36 | 24 | 1.5 |
| Pentylenetetrazol sold under the trademark "Metrazol." | 90 | 39 | 2.3 |
| Methylphenidate sold under the trademark "Ritalin." | 96.5 | Inactive at 10–150. | |
| Ethamivan sold under the trademark "Emivan." | 37 | Inactive at 10–200. | |
| Caffeine citrate | 540 | Inactive at 35–500. | |
| Nikethamide | 245 | Inactive at 150–300. | |

From the results shown in the above tables it can be seen that three of the compounds of the present invention are more active than five of the seven reference compounds. Most importantly, the safety margins of five of the novel compounds of the present invention are better than any of the reference compounds and three have safety margins greater than 10.

Various modifications, adaptations and further examples of the present invention can be devised, after reading the foregoing specification and the claims appended hereto, by the person skilled in the art without departing from the spirit and scope of the invention. Thus, it will be apparent that various mutual solvents other than dimethylformamide and dimethylsulfoxide can be used for the reaction of 6-amino-1,3-dimethyluracil with isothiocyanate to prepare the intermediate uracil thioureas used in preparing these novel uracil thiopseudoureas of the present invention and various mutual solvents other than acetone and ethanol can be used for the reaction of said uracil thioureas with alkyl halide to prepare said novel uracil thiopseudoureas. So also, the reaction conditions of temperature, time and proportions of reactants can be modified from those illustrated in the specific examples. When solvent media is used for the synthesis of the uracil thiopseudourea salts, it is preferred to use acetone at reflux temperatures. In this synthesis the uracil thiourea is generally reacted with a molar equivalent or an excess of alkyl halide at reflux temperature. An effective barbiturate antagonist dose of the uracil thiopseudoureas can be formulated in any conventional dosage form for administration, including admixtures with many solid and liquid diluents, carriers and adjuvants other than those previously described. These dosages can be administered to revive animals given an overdose of barbiturates, sedatives and hypnotics such as, for example, pentobarbital sodium, phenobarbital, phenobarbital sodium, chloral hydrate and the like substances. All such variations, modifications and further examples are included within the scope of the invention as defined in the following claims.

What is claimed is:

1. The method of reviving an animal given an overdose of barbiturate comprising administering to said animal a barbiturate antagonist dose of a compound selected from the group consisting of a thiopseudourea having the formula wherein R and R' are each independently selected from the group consisting of lower alkyl having from 1 to about 3 carbon atoms, allyl and methallyl; and the pharmaceutically acceptable acid salts thereof.

References Cited

UNITED STATES PATENTS

| 3,448,197 | 6/1969 | Regan | 424—324 |
| 3,448,198 | 6/1969 | Regan | 424—324 |
| 3,124,595 | 3/1964 | Borger | 260—319 |

OTHER REFERENCES

Wagner et al.: Synthetic Organic Chemistry, 1953, p. 779.

ALBERT T. MEYERS, Primary Examiner

N. A. DREZIN, Assistant Examiner

U.S. Cl. X.R.

424—10